Aug. 25, 1970  D. W. PRINE ET AL  3,525,934
NONDESTRUCTIVE MICROWAVE TESTING SYSTEM FOR WIRE
Filed May 24, 1967  4 Sheets-Sheet 1
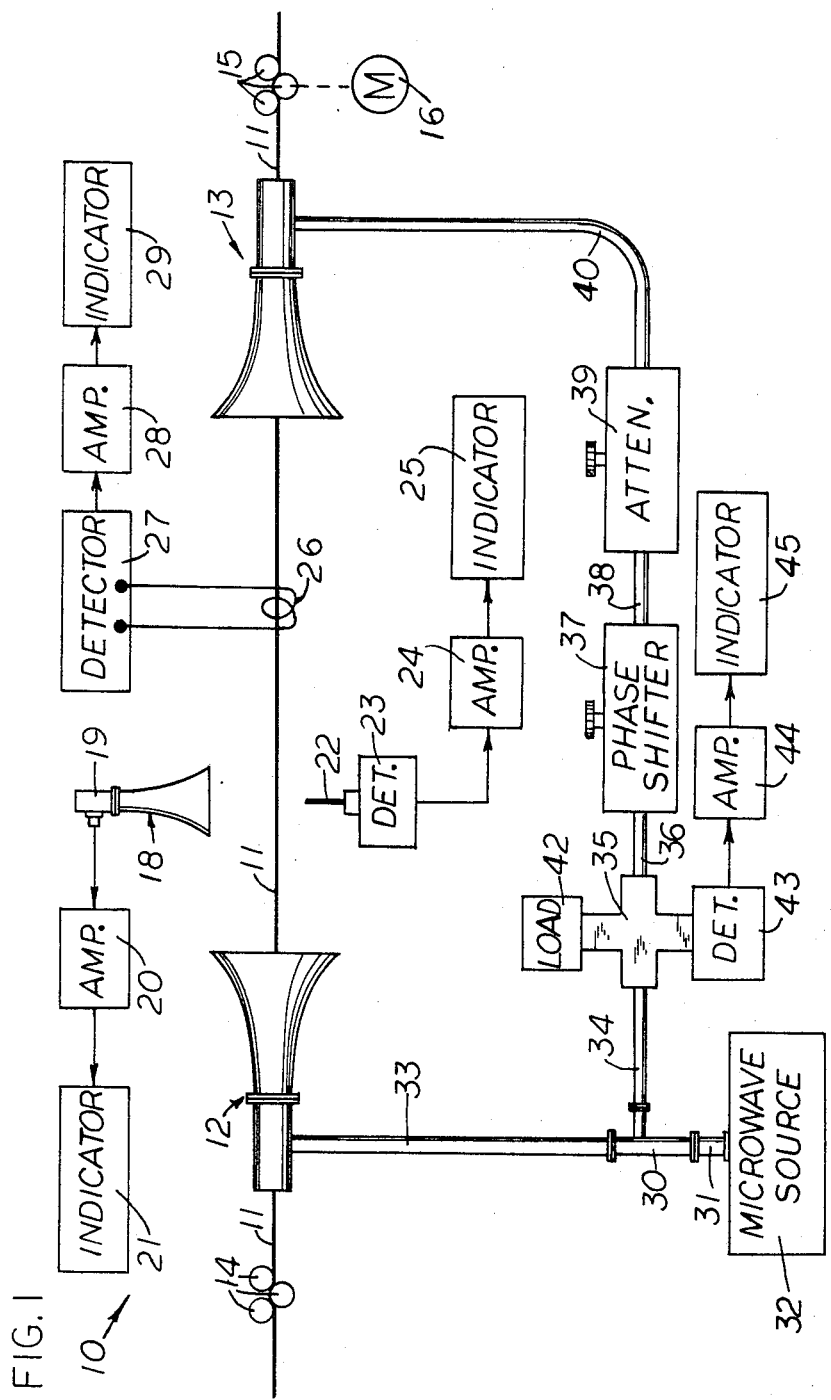
FIG.1
FIG.2
FIG.3
FIG.4
INVENTORS
DAVID W. PRINE
JOHN J. FLAHERTY
BY
Hill, Sherman, Meroni, Gross & Simpson
ATTORNEYS

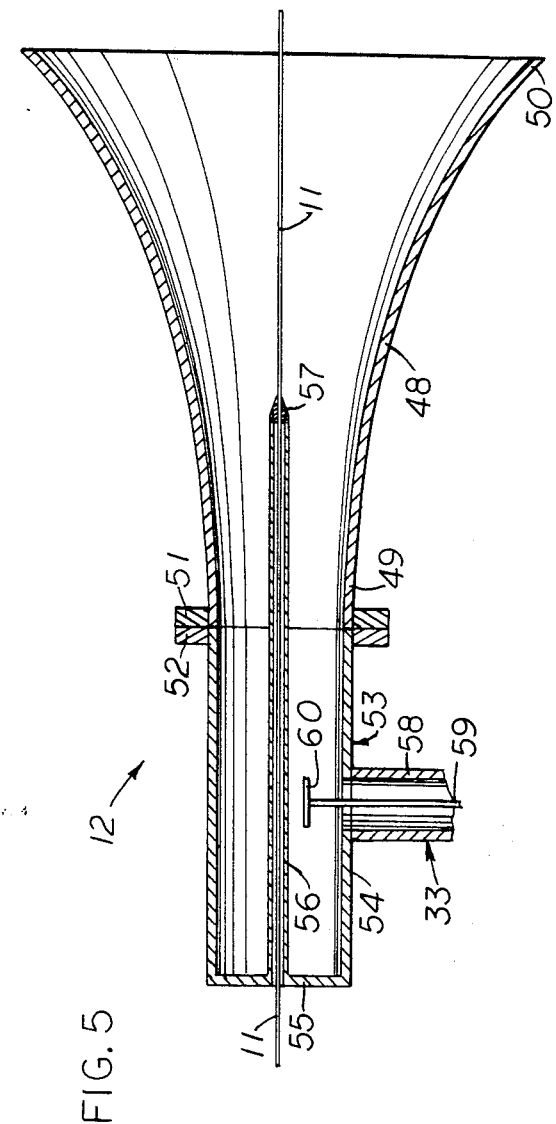
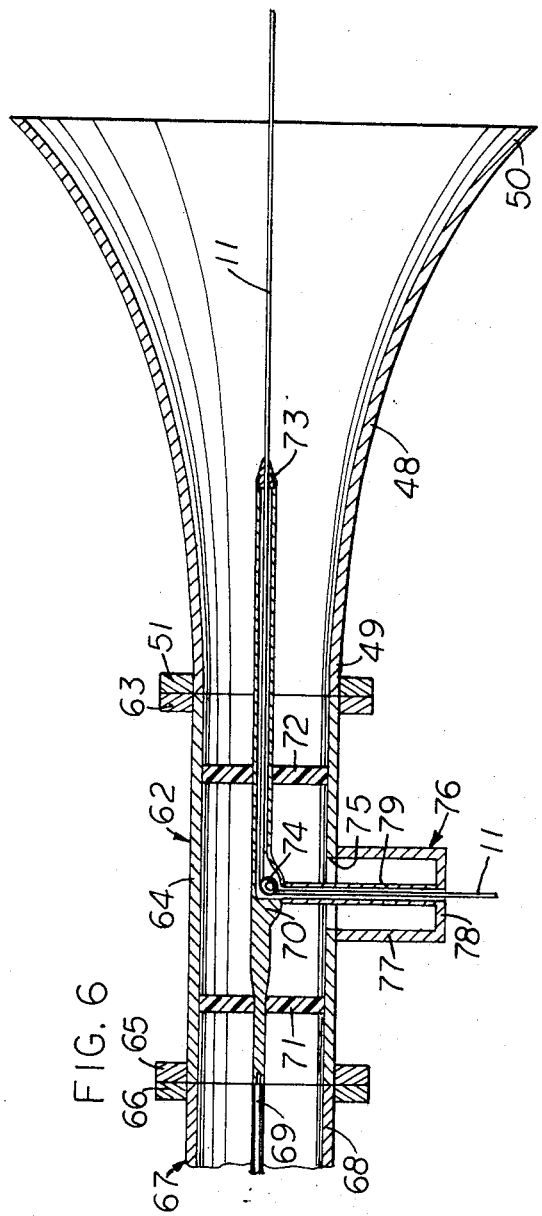

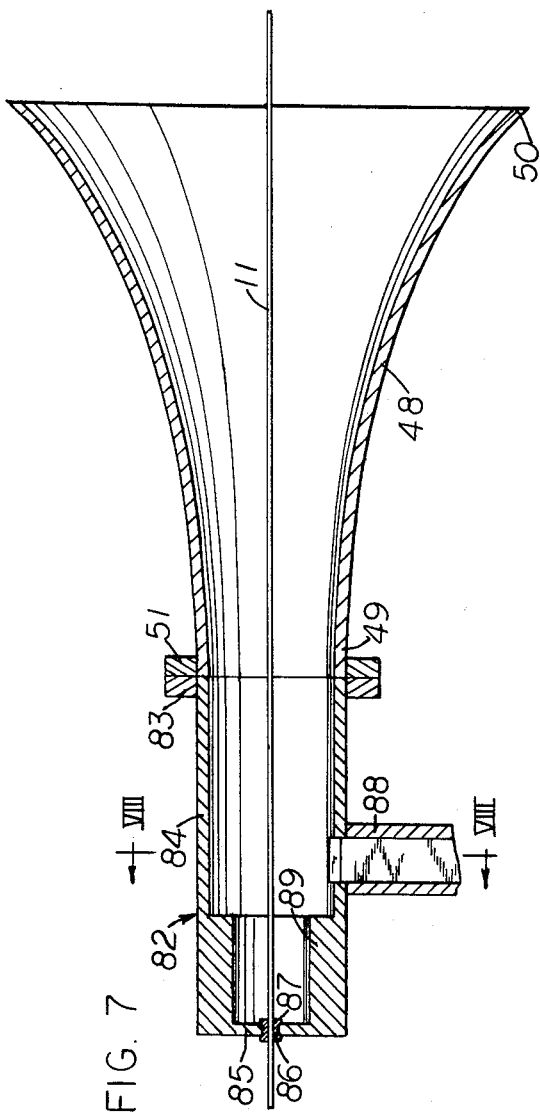
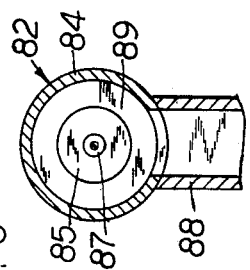

Figures 9, 10:
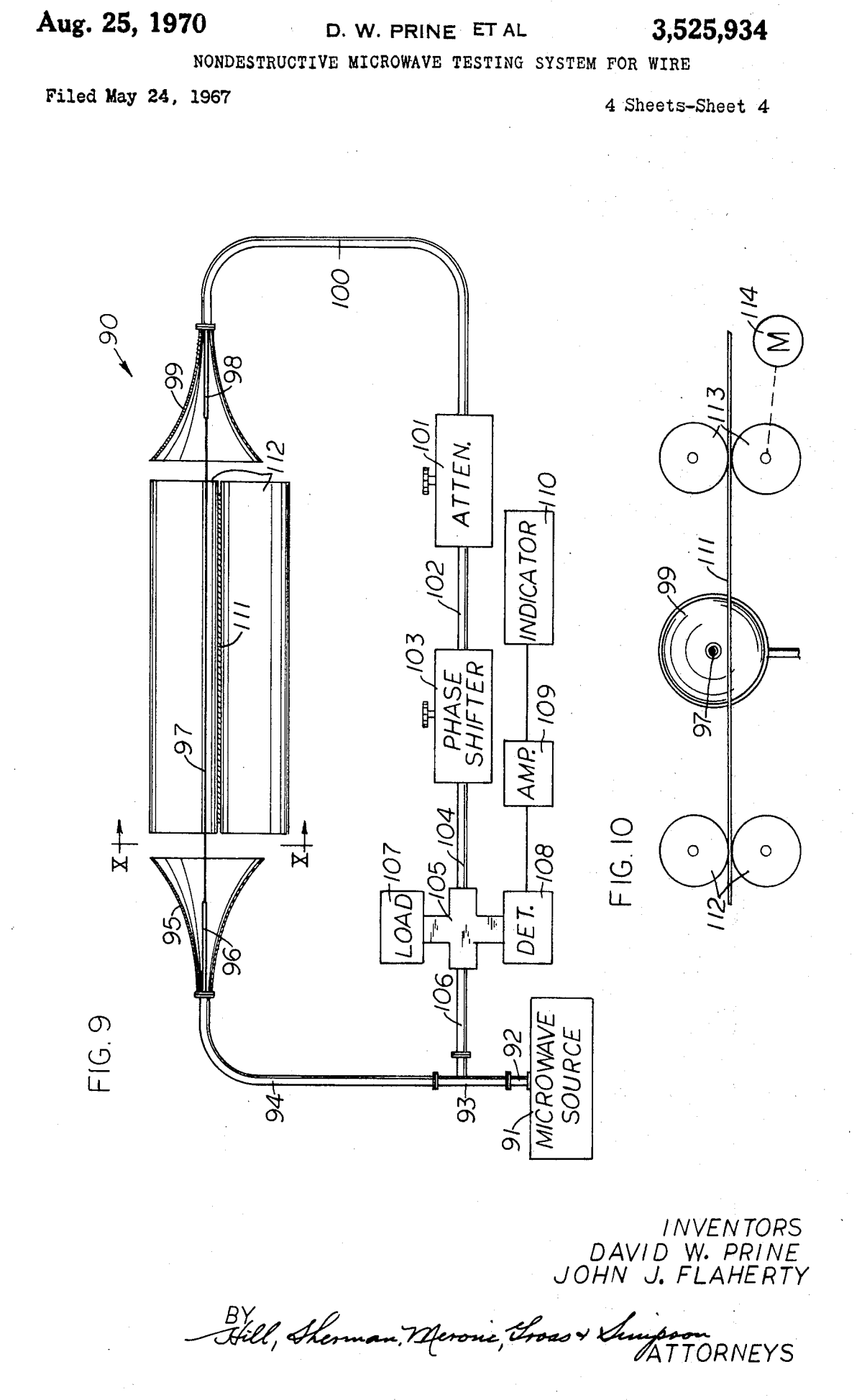

Aug. 25, 1970   D. W. PRINE ET AL   3,525,934
NONDESTRUCTIVE MICROWAVE TESTING SYSTEM FOR WIRE
Filed May 24, 1967   4 Sheets-Sheet 4

INVENTORS
DAVID W. PRINE
JOHN J. FLAHERTY

BY Hill, Sherman, Meroni, Gross & Simpson
ATTORNEYS

United States Patent Office  3,525,934
Patented Aug. 25, 1970

3,525,934
NONDESTRUCTIVE MICROWAVE TESTING SYSTEM FOR WIRE
David W. Prine, Maywood, and John J. Flaherty, Elk Grove Village, Ill., assignor to Magnaflux Corporation, Chicago, Ill., a corporation of Delaware
Filed May 24, 1967, Ser. No. 640,966
Int. Cl. G01r 27/04
U.S. Cl. 324—58.5                                    20 Claims

ABSTRACT OF THE DISCLOSURE

Nondestructive testing systems wherein variations in microwave energy propagated along a wire are detected to detect variations in the characteristics of the wire, or variations in the characteristics of a test piece such as a member of sheet material disposed adjacent the wire. In the wire testing systems, a short length of the wire is inspected at each instant of time and the wire is continuously movable through wave propagation means to permit inspection of a long length of wire. Important features relate to launching and receiving horns and coupling arrangements which permit propagation along a continuously moving wire. Further features relate to detection means of various forms including a horn, a probe or a loop arranged to detect scattered radiation, or a bridge arrangement by which received energy is compared with reference energy derived from the energizing source.

---

This invention relates to nondestructive testing systems and more particularly to systems using microwave energy to provide an accurate and reliable indication of flaws or variations in characteristics of an object. The systems are particularly advantageous in that a small portion of an elongated object can be inspected at each instant of time with the object being movable at high speeds to permit rapid inspection of substantially the entire length of the object.

Various systems have heretofore been proposed for the testing of elongated objects such as wires and sheet materials and although such systems have been satisfactory for some purposes, they have had serious limitations with respect to the types of characteristics which can be measured and with respect to the speed at which inspection can be accomplished. By way of example, there has been no known automatic inspection technique which is suitable for determining the degree of cure of the insulating coating on a wire.

This invention was evolved with the general object of overcoming the disadvantages of prior systems and of providing systems using microwave energy for the sensitive and accurate high speed inspection of elongated objects.

The systems of this invention utilize the transmission of microwave energy along a wire, which may be accomplished because of a forward tilt of the electric field vector along a wire having a finite electrical conductivity. With a forward tilt of the electric field vector, the direction of energy flow is into the wire instead of parallel to the wire, (as would be the case if the wire were perfectly smooth and had infinite conductivity), which tends to keep the energy from spreading out and concentrates it near the surface of the wire, resulting in a bound wave. The field does exist to infinity but with proper launching of the wave, the energy is concentrated within a few wavelengths of the surface.

In accordance with important features of the invention, the microwave energy is propagated along a wire from launching means to receiving means connected to a suitable load, the launching and receiving means preferably being in the form of horns in spaced facing relation, having axes aligned with the wire.

Certain of the systems of the invention are usable in the measurement of the characteristics of a wire, based upon the discovery that variations in the characteristics of the wire such as variations in the degree of cure of an insulating coating on the wire, or defects in the wire or in its coating, produce measurable variations in the amount of energy propagated along the wire and may also produce scattered radiation of energy. Microwave energy can be propagated with a high degree of effectiveness along a wire of a highly conductive metal, such as copper, having an insulating coating, or along a wire of relatively low electrical conductivity, such as a wire of a ferrous material.

Specific features of the invention relate to the construction of launching and receiving horns and to microwave coupling means which permit the continuous movement of the wire during inspection thereof. The arrangements are such that the wire can be moved at relatively high speeds, without disturbing the sensitivity and accuracy of the measurements.

Further important features of the invention relate to detection means for the measurement of variations in energy transmitted along the wire. In particular, means are provided for detection of scattered radiation, in the form of a probe adjacent the wire, a horn disposed on an axis generally transverse to the wire, or a loop which may be disposed adjacent the wire or in surrounding relation thereto. In another form of detection means, a bridge arrangement is provided by which received energy is compared with reference energy derived from the energizing source.

This invention contemplates other objects, features and advantages which will become more fully apparent from the following detailed description taken in conjunction with the accompanying drawings which illustrate preferred embodiments and in which:

FIG. 1 illustates a wire testing system constructed in accordance with the principles of this invention;

FIG. 2 is a view showing the direction of electric, magnetic and energy flow vectors existing theoretically with a smooth-surfaced wire of infinite conductivity;

FIG. 3 is a view similar to FIG. 2, showing the directions of vectors with a wire having an insulating coating;

FIG. 4 is a view similar to FIGS. 2 and 3, showing the direction of vectors with a wire having a relatively low electrical conductivity;

FIG. 5 is a cross-sectional view of a launching horn of the system of FIG. 1.

FIG. 6 is a view similar to FIG. 5, illustrating a modified form of horn;

FIG. 7 is a cross-sectional view similar to FIGS. 5 and 6, illustrating another modified form of launching horn;

FIG. 8 is a cross-sectional view taken substantially along line VIII–VIII of FIG. 7;

FIG. 9 illustrates a system for the testing of sheet material constructed in accordance with the principles of the invention; and FIG. 10 is a cross-sectional view taken substantially along line X—X of FIG. 9.

Referring to FIG. 1, reference numeral 10 generally designates a wire testing system constructed in accordance with the principles of this invention. In the system 10, microwave energy is transmitted along a wire 11 from a launching horn 12 to a receiving horn 13, and variations in the energy propagated along the wire 11 are detected to detect variations in the characteristics of the wire 11. It is an important feature of the invention that the wire 11 can be moved continuously through the inspection means so that a long length of the wire can be rapidly inspected, only a short length of the wire being inspected at each instant of time. As diagrammatically illustrated, the wire 11 may be guided into the launching horn 12 through suitable rollers 14 and may be guided out of the receiving horn 13 through suitable rollers 15, at least one of which may be driven by a suitable motor 16.

The operation of the system is based upon the fact that an electromagnetic wave may be guided along the surface of a single wire of finite conductivity, which is due to a forward tilt of the E or electric field vector. FIG. 2 shows the vector relationship which would be obtained theroretically with a prefectly smooth wire having infinite conductivity. The E or electric field vector would be normal to the wire axis as well as being normal to the H or magnetic field vector, the H vector being normal to the plane of the paper and toward the viewer in the illustration of FIG. 2. Under such conditions, the Poynting vector S, indicating the magnitude and direction of energy flow, would be parallel to the axis of the wire. Under such conditions, the energy would spread out as it travelled along the wire.

FIG. 3 shows the relationship of the vectors with the wire 11, consisting of a coating 11a of insulating material on a base 11b of a highly conductive metal, such as copper. In this case, there is a forward tilt of the E or electric field vector, and the energy flow vector S is also tilted into the wire, which tends to keep the energy from spreading out and concentrates the energy near the surface of the wire, resulting in a bound wave. Although the field does exist to infinity, it is concentrated within a few wavelengths of the surface of the wire.

FIG. 4 shows a similar vector relationship with a wire 11' having a relatively low conductivity, such as a wire of a ferrous material.

It is found that the field relationships are affected substantially by variations in the conductivity of the wire, variations in the dielectric constant of the wire coating, and cracks in the wire or in the coating. As a result of such variations, there are detectable variations in the energy which is scattered to points spaced outwardly from the wire, as well as variations in the energy transmitted along the wire.

As shown in FIG. 1, the energy which is scattered from a short length of the wire 11 between the launching and receiving horns 12 and 13 may be detected by means of a horn 18, connected to a detector 19 which may be connected through an amplifier 20 to an indicator 21. The horn 18 may preferably be disposed with its axis generally normal to the axis of the wire 11, to minimize direct transmission of energy from the launching horn 12 into the horn 18.

In addition, or as an alternative, the scattered radiation may be detected by means of a probe 22 mounted on a detector 23 which is connected through an amplifier 24 to an indicator 25.

Further, or as a third alternative, a loop 26, having one or more convolutions, may be disposed either adjacent the wire 11 or around the wire 11 as illustrated, the loop 26 being connected to a detector 27 which is connected through an amplifier 28 to an indicator 29. It will be appreciated that each of the arrangements permits the detection of the radiation scattered from a relatively short length of the wire 11, so that cracks or other in homogeneities in a very short length of the wire 11 can be detected.

FIG. 1 shows still anoher arrangement for detecting variations in the energy propagated along the wire 11. In particular, a directional coupler 30 is provided, connected through a guide 31 to a microwave source 32, through a guide 33 to the launching horn 12 and through a guide 34 to one arm of a hybrid T 35. Most of the energy transmitted through the guide 31 to the directional coupler 30 is transmitted through the guide 33 to the launching horn 12, but a relatively small portion thereof is transmitted through the guide 34 to the hybrid T 35. A second arm of the hybrid T 35 is coupled through a wave guide 36, through a variable phase shifter 37, through a wave guide 38, through a variable attenuator 39 and through a wave guide 40 to the receiving horn 13, a portion of the energy propagated along the wire 11 to the horn 13 being thus applied to the second arm of the hybrid T 35. A third arm of the hybrid T 35 is terminated in a matched load 42, while a fourth arm is connected to a detector 43 which develops a signal applied through an amplifier 44 to an indicator 45. The indicator 45, as well as the indicator 21, 25 and 29 may be in the form of meters, oscilloscopes, recorders, or the like.

In operation, the system may be balanced with a length of wire disposed between the launching and receiving horns 12 and 13 having desired characteristics, by adjustment of the variable phase shifter 37 and the variable attenuator 39. Then, any attenuation or phase disturbances produced by a change in the propagation characteristics along the wire 11 will cause a change in the indication produced by the indicator 45. This arrangement has been used to monitor the curing process of a resin coating applied to a wire. A wire coated with a thin film of dielectric material has a propagation velocity which is greatly dependent upon the dielectric properties of the film, and the dielectric properties of various resins and varnishes go through marked changes as they go through their cure cycle. Thus the system is usable to monitor the degree of cure of a resin insulation such as is typically used on a magnet wire. The system is also usable for detecting cracks in the base metal of the wire, breaks in the coating, or other inhomogeneities. In addition, it may be used in the inspection of steel or iron wire products, because the relatively low conductivity of ferrous materials makes possible the effective propagation of energy along the wire. It is further noted that the components of the system in proximity to the wire can withstand high temperatures, and thus the system can be used in inspection of hot products.

Referring now to FIG. 5, the launching horn 12 comprises a wall 48, preferably having a cylindrical cross-sectional shape, and diverging from a relatively narrow throat portion 49 to an enlarged mouth portion 50. A flange 51 at the end of the throat portion 49 is secured to a flange 52 of a fitting 53 having a cylindrical wall 54 forming a continuation of the throat portion 49, the fitting 53 having a closed end wall 55. A hollow conductor 56 is supported from the end wall 55 and extends centrally along the axis of the horn toward the mouth portion 50. The wire 11 extends through the hollow conductor 56, and a bushing 57 of a suitable wear-resistant material is affixed at the end of the conductor 56, for closely embracing the wire 11.

To couple energy into the horn 12, the guide 33 is in the form of a coaxial line having an outer conductor 58 affixed to the wall 54 at an opening therein and having an inner conductor 59 connected to a probe 60 disposed adjacent the conductor 56.

It is noted that the receiving horn 13 may have a construction substantially identical to that of the launching horn 12.

FIG. 6 illustrates a modified arrangement wherein a fitting 62 is provided having a flange 63 secured to the flange 51, and having a cylindrical wall 64 forming a continuation of the throat portion 49. A flange 65 at the opposite end of the fitting 62 is secured to a flange 66 of a coaxial guide 67 having an outer conductor 68 forming a continuation of the wall 64 and having an inner conductor 69. The inner conductor 69 is connected to one end of a conductor 70 supported within the fitting 64 by suitable insulators 71 and 72. The conductor 70 is partially hollow to receive the wire 11 and it extends toward the mouth portion 50, a wear-resistant bushing 73 being provided at the terminal end of the conductor 70.

At an intermediate point within the hollow conductor 70 a small grooved roller 74 is rotatably supported, forming a guide to project transversely out of the conductor 70, while permitting relatively free movement of the wire. The wire extends out through an opening 75 in the wall 64 and to prevent transmission of energy out of the opening 75, a section 76 is provided having a cylindrical wall 77 joined to the wall 64 at the opening 75 with a closed end wall 78 provided with a central opening through which the wire 11 extends, the electrical length of the section 76 being preferably one-quarter wavelengths (or an odd number of quarter wavelengths). A hollow conductor 79 may be provided, surrounding the wire 11 and extending from the wall 78 to the conductor 70. In this arrangement, the energy is transmitted from a microwave source through the coaxial guide 67 and into the end of the fitting 64 to be propagated along the wire 11 by the horn 12, in a circular mode.

FIGS. 7 and 8 illustrate another modified arrangement wherein a fitting 82 is provided having a flange 83 secured to the flange 51 of the horn 12 and having a cylindrical wall 84 forming a continuation of the wall of the throat portion 49 and extending to a closed end wall 85 which is provided with a small central opening 86 through which the wire 11 extends. Preferably, a wear-resistant bushing 87 may be disposed in the opening 86, closely embracing the wire 11 to hold it in a centered position.

To couple energy into the horn, a rectangular wave guide 88 is provided, extending transversely from the wall 84, from about an opening therein.

To increase efficiency and to prevent transmission of undesired modes, a wall portion 89 of reduced diameter is provided, extending from the closed end wall 85 toward the mouth of the horn. The section 89 should preferably have an electrical length of one-half wavelength with respect to the $TM_{01}$, which is the desired mode of transmission, while having an electrical length three-fourths wavelength with respect to the $TE_{11}$ mode, which is an unwanted mode.

Referring now to FIGS. 9 and 10, reference numeral 90 generally designates a system for testing sheet materials, constructed in accordance with the principles of this invention. In the system 90, a microwave source 91 is connected through a coaxial guide 92, through a directional coupler 93 and through a coaxial guide 94 to the throat end of a launching horn 95. A conductor 96 is supported on the axis of the horn 95 and is connected at one end to the central conductor of the guide 94 and at its opposite end to one end of a wire 97. The other end of the wire 97 is connected to a conductor 98 supported coaxially within a receiving horn 99. The opposite end of the conductor 98 and the throat end of the horn 99 being respectively connected to the inner and outer conductors of a coaxial guide 100. The guide 100 is connected through a variable attenuator 101, a guide 102, a variable phase shifter 103 and a guide 104 to one arm of a hybrid T 105 having a second arm connected through a guide 106 to the directional coupler 93. A third arm of the hybrid T 105 is terminated in a matched load 107 while a fourth arm thereof is coupled to a detector 108 which develops the signal applied through an amplifier 109 to an indicator 110.

Sheet material 111 to be tested is supported in a plane generally parallel to the axis of the wire 97 and in proximity thereto. As shown in FIG. 10, the sheet material 111 may be fed between a pair of rollers 112 past the wire 97 and thence between a pair of rollers 113 one of which may be driven by a suitable motor 114.

In operation, the variable attenuator 101 and the variable phase shifter 103 are adjusted to obtain a balance when sheet material having the desired or standard characteristics is disposed adjacent the wire 97. If the sheet material disposed adjacent the wire 97 has different characteristics, it will affect the propagation of energy along the wire 97, resulting in an unbalance and the production of an indication by the indicator 110. This system is highly advantageous in that the portion of the material through which the microwave energy is transmitted can be restricted to very narrow dimensions, to obtain more sensitive and accurate indications.

It will be understood that the systems of this invention can be used in the testing of materials other than wire and sheet materials. Thus it might be used in the monitoring of the dielectric properties of fluids, either gas or liquid, by extending the wire through the fluid.

It will be understood that other modifications and variations may be effected without departing from the spirit and scope of the novel concepts of this invention.

We claim as our invention:

1. In a system for testing wire, support means supporting said wire for lengthwise movement including a pair of supports engageable with longitudinally spaced portions of said wire, means for continuously advancing said wire between said support means while said wire is being tested, propagation means adjacent one of said supports and arranged for propagating microwave energy along said wire toward the other of said supports while said wire is being advanced, the surrounding space within a few wave lengths of said wire having substantially uniform characteristics with respect to the propagated energy such that the propagation of energy is effected only by the characteristics of said wire, and detecting means for detecting variations in the microwave energy propagated along said wire due to energy scattered from said wire by inhomogeneities therein, said detected variations in energy being indicative of said inhomogeneities in said wire.

2. In a system as defined in claim 1, said detecting means comprising pick-up means adjacent a portion of said wire between said propagation means and said other of said supports for receiving energy scattered from said wire by inhomogeneities therein.

3. In a system as defined in claim 2, said pick-up means comprising a probe positioned adjacent said wire.

4. In a system as defined in claim 2, said pick-up means comprising a loop extending around said wire.

5. In a system as defined in claim 1, said detecting means comprising receiving means adjacent said other of said supports for receiving energy propagated along said wire from said propagation means, means coupled to said propagation means for supplying a reference energy proportional to the energy supplied from said propagation means, and means for comparing said received energy with said reference energy.

6. In a system as defined in claim 1, said propagation means comprising a microwave source, and launching means coupled to said source for effecting propagation of microwave energy along said wire in a circular mode.

7. In a system as defined in claim 6, said launching means comprising a horn having a central axis substantially aligned with the axis of said wire.

8. In a system as defined in claim 7, said launching horn including a narrow throat portion, an enlarged mouth portion and wall means diverging from said narrow throat portion to said enlarged mouth portion, and coupling means for propagating microwave energy into said throat portion.

9. In a system as defined in claim 6, receiving means is spaced relation to said launching means for receiving energy propagated in said circular mode along said wire from said launching means, and load means coupled to said receiving means.

10. In a system as defined in claim 9, said launching and receiving means including a pair of horns in spaced facing relation having central axes substantially aligned with the axis of said wire.

11. In a system as defined in claim 10, each of said horns including a relatively narrow throat portion, an enlarged mouth portion and wall means diverging from said throat portion to said mouth portion, means for propagating microwave energy into said throat portion of said launching means, and means for propagating microwave energy from said throat portion of said receiving horn to said load.

12. In a system as defined in claim 8, a hollow conductor surrounding a portion of said wire and supported centrally within said throat portion.

13. In a system as defined in claim 12, said coupling means comprising a coaxial line having an outer conductor joined to said wall means of said horn and having an inner conductor joined to said hollow conductor.

14. In a system as defined in claim 13, said wall means having an opening therein and said wire being supported to extend from said hollow conductor out through said opening.

15. In a system as defined in claim 14, a section extending transversely from said horn having an open end joined to said wall means at said opening and a closed end spaced an odd number of quarter wave lengths from said open end, said closed end having a central opening through which said wire extends.

16. In a system as defined in claim 8, a wall closing one end of said throat portion and having a central opening therein through which said wire extends.

17. In a testing system as defined in claim 16, said wall means of said horn including means defining a section of reduced diameter extending from said wall and having a length equal to a whole number of half wave lengths with respect to desired modes of exitation, and having an odd number of quarter wave lengths with respect to undesired modes of exitation.

18. In a testing system as defined in claim 8, said coupling means comprising a transmission line section extending transversely from said throat portion of said horn.

19. In a system as defined in claim 18, said transmission line section being a hollow wave guide.

20. In a system as defined in claim 18, said transmission line section being a coaxial guide having an outer conductor joined to said wall means and an inner conductor extending into said throat portion, and probe means on the end of said inner conductor.

References Cited

UNITED STATES PATENTS

| | | |
|---|---|---|
| 2,548,598 | 4/1951 | Feiker. |
| 2,797,388 | 6/1957 | Maybury et al. |
| 3,056,926 | 10/1962 | Borck et al. |
| 3,079,551 | 2/1963 | Walker. |
| 3,079,552 | 2/1963 | Walker. |
| 3,122,665 | 2/1964 | Bailey. |
| 3,161,825 | 12/1964 | Wilkinson. |

RUDOLPH V. ROLINEC, Primary Examiner

M. J. LYNCH, Assistant Examiner

U.S. Cl. X.R.

324—52, 54